Figure 1:
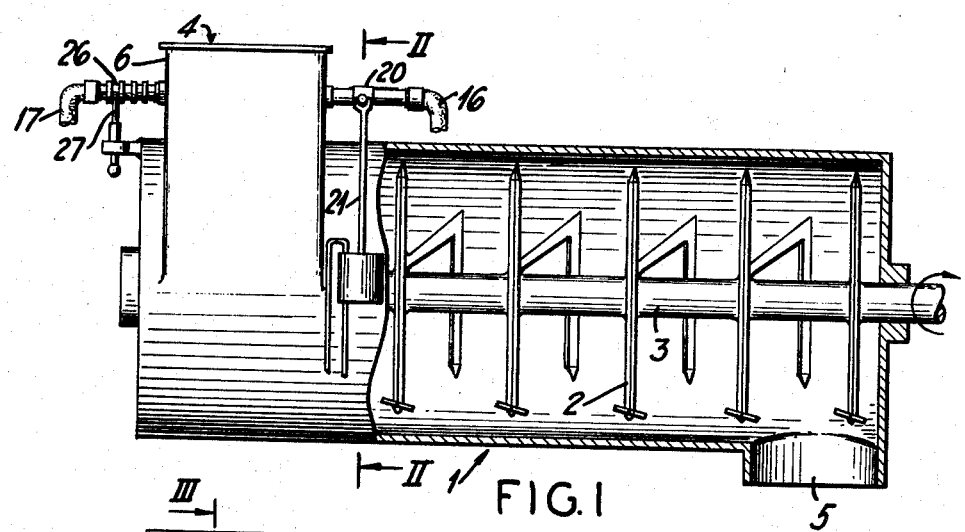

April 6, 1965 E. RÜEGGER 3,176,718
LIQUID SUPPLY SYSTEM FOR MIXING MACHINE
Filed Sept. 18, 1962 2 Sheets-Sheet 1

INVENTOR.
EDGAR RÜEGGER
BY
*McHew & Toren*
ATTORNEYS.

April 6, 1965 E. RÜEGGER 3,176,718
LIQUID SUPPLY SYSTEM FOR MIXING MACHINE
Filed Sept. 18, 1962 2 Sheets-Sheet 2

INVENTOR.
EDGAR RÜEGGER
BY
McGlew & Toren
ATTORNEYS.

United States Patent Office 3,176,718
Patented Apr. 6, 1965

3,176,718
LIQUID SUPPLY SYSTEM FOR MIXING MACHINE
Edgar Rüegger, Gossau, Sankt Gallen, Switzerland, assignor to Gebruder Buhler, Uzwil, Switzerland, a company of Switzerland
Filed Sept. 18, 1962, Ser. No. 224,343
Claims priority, application Switzerland, Sept. 18, 1961, 10,790/61
5 Claims. (Cl. 137—625.17)

Liquid supply systems for mixing machines have to be provided with a shut-off device to interrupt delivery of liquid as soon as the supply of another mixture component fails for one reason or another.

In the conventional designs hitherto known having a shut-off device arranged outside the mixing chamber and the ingredient feeding device, an essential disadvantage consists in the fact that the portion of liquid in the delivery pipe section between the shut-off device and the discharge end of the pipe continues to flow into the mixing chamber when the shut-off device is already closed. This further liquid flow without other mixture components is generally not desired. In a molassizing machine, for example, used for manufacturing forages to mix forage flour with viscous liquors such as molasses, lecithine or liquid fatty substances, formation of lumps can easily take place which cannot be brought to disintegrate by subsequent further treatment. Even a small amount of such lumps will do to considerably reduce the quality of a great quantity of the final product. Small quantities of molasses entering the running machine while the supply of forage flour is stopped will be thrown against the walls of the mixing chamber and stick there. Forage flour subsequently supplied again then forms a thick firmly adhering layer on the walls braking the movement of the mixing blades resulting in a considerable increase of the energy required to operate this high-speed machine which runs at approximately 1500 r.p.m.

This invention now provides means to avoid the aforementioned disadvantages. Besides the lower power requirements and the elimination of lump formation, an additional advantage consists in that the machine requires cleaning less often.

The liquid supply system for mixing machines according to the present invention is characterized in that an operable shut-off device is arranged at the very discharge end of the liquid supply system disposed within the mixing chamber or the ingredient feed duct.

In further developments of the basic conception of this invention practical means are provided, which, in spite of their simplicity, ensure proper and safe working.

By subdividing the discharge opening into a plurality of passages and orifices a simple means for quantitative variation of the liquid discharge is obtained.

In one embodiment of this invention comprising two pipes arranged concentrically in one another several dissimilar liquids may be supplied simultaneously and even in individually variable quantities.

Figure 2:
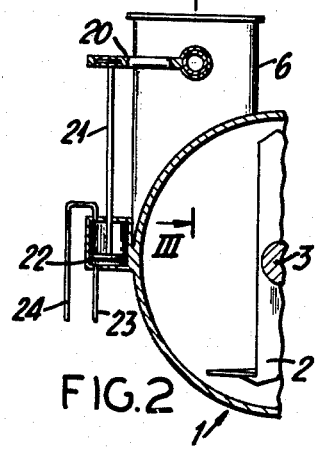

Two embodiments of the liquid supply system according to this invention in a molassizing machine are described by way of example in the following description and shown in the appended drawing, wherein FIG. 1 shows a side elevation of a molassizing machine partially in longitudinal section, FIG. 2 is a cross-section along the line II—II in FIG. 1.

Figure 7:
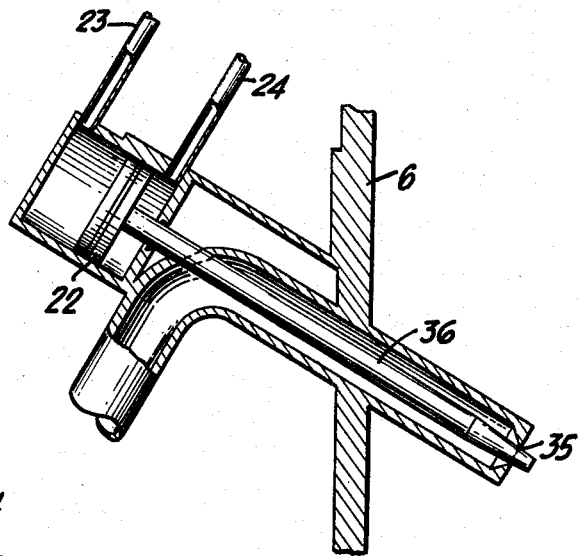
Figure 6:
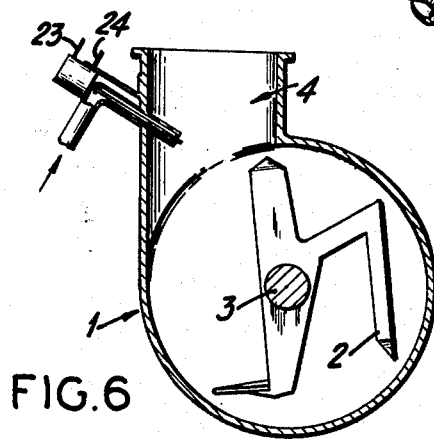
Figure 3:
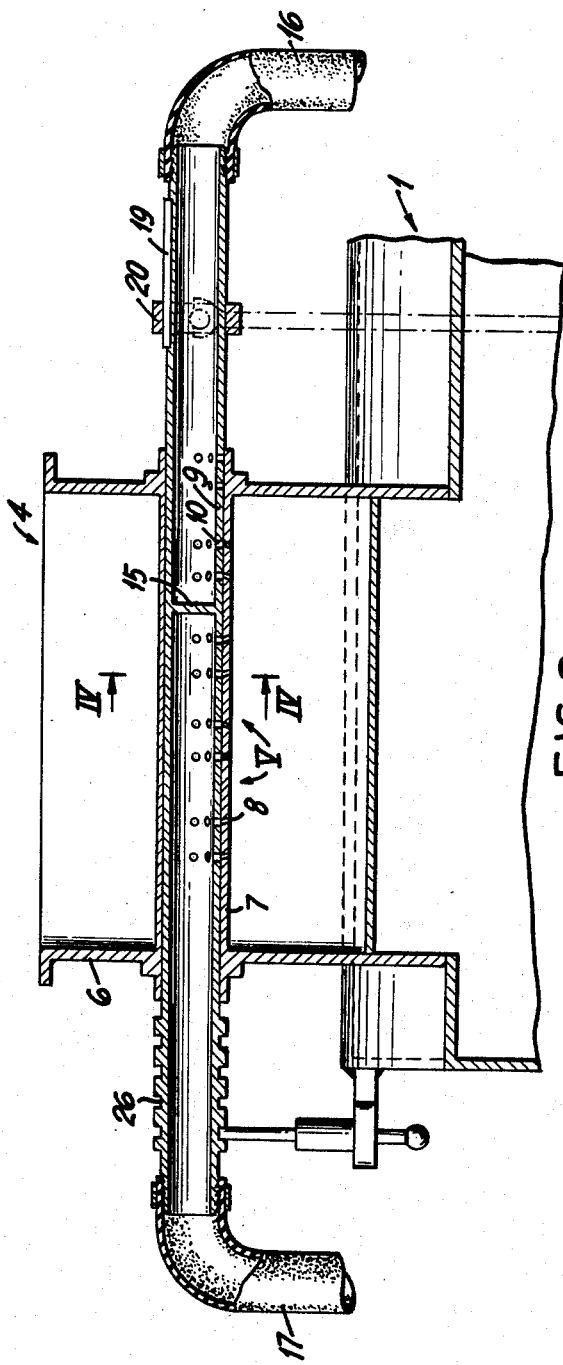
Figure 4:
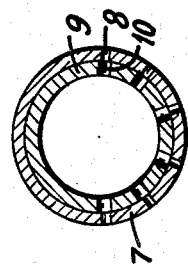
Figure 5:
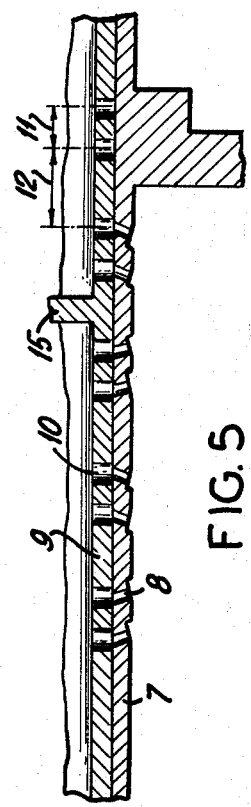

FIG. 3 shows, in an enlarged scale, a detail in cross-section along line III—III of FIG. 2, FIG. 4 is a cross-section in a still larger scale along line IV—IV of FIG. 3, FIG. 5 shows in a larger scale the detail V of FIG. 3, FIG. 6 is a cross-section at the intake through a molassizing machine having a liquid supply device according to this invention, and FIG. 7 shows in a larger scale the details of FIG. 6.

As shown in FIGS. 1 and 2 a mixer shaft 3 having mixer blades 2 fixed thereon is rotatably arranged in a mixing chamber 1, which is provided with an intake connection 4 at one end and an outlet connection 5 at the opposite end.

Between walls 6 of said intake connecting portion 4, a pipe 7 provided with a plurality of orifice holes 8 is fixed as shown by FIGS. 3 to 5. Within pipe 7 another pipe 9 provided with passage holes 10 is axially slidable and rotatably arranged.

According to FIG. 5, holes 8 and 10 are arranged in groups of two holes, the mutual distance 11 between axes of holes of the same group being one half of the distance 12 between axes of neighboring holes of neighboring groups.

The inner pipe 9 is subdivided inside by a transverse partition wall 15, and each end of said pipe connected to a supply conduit, e.g., a hose 16 and 17 respectively.

Pipe 9 is moreover coupled by means of a key 19 with a lever 20 operated through a piston rod 21 by a piston 22, which is actuated by fluid pressure through control pipes 23 and 24, respectively.

In the external wall surface of pipe 9 circumferential grooves 26 are arranged to lock said pipe axially by means of a locking pin 27. The distances between center lines of adjacent grooves correspond with the distances 11 of neighboring passage and orifice holes 10 of a group. In the position indicated, passage holes 10 of the inner pipe 9 match with orifices 8 of the surrounding pipe 7, as shown in FIGS. 3–5. Dissimilar liquids which may be measured by some not shown dosing device are supplied through hoses 16 and 17 respectively.

Should the supply of forage flour through intake 4 cease, some not shown control device energizes piston 22 through conduit 23 to rotate lever 20 by a certain angle with the result that orifices 8 no longer communicate with passage holes 10, thereby stopping the liquid supply to the mixing chamber instantaneously. Pipe 9 therefore forms a shut-off member arranged immediately behind each individual of the plurality of orifices 8 constituting the discharge end of the liquid supply system disposed within intake 4 of said mixing chamber.

As soon as the forage flour supply is restored the not shown control device energizing piston 22 through conduit 24 restores communicating relationship of orifices 8 and passage holes 10, as represented in FIGS. 3 to 5, thereby restoring the liquid supply again for mixing chamber 1.

The number of communicating discharge holes 8, 10 is smaller on the right-hand side of transverse partition wall 15 in FIGS. 3 and 5 communicating with hose 16, than on the left which communicates with hose 17. In the position of pipe 9 represented, this arrangement enables selection of adjustable liquid supply ratios of approximately 1:3 or less.

The same ratio of the liquids supplied as in the above described position of pipe 9, but a reduced total rate of liquid delivered is obtained by withdrawing locking pin 27 from first groove 26 shown in the drawing and shifting pipe 9 leftwards until pin 27 can be engaged with the second groove 26. In this position only one half of the number of orifices 8 communicate with corresponding passage holes 10 as compared with the previous position of pipe 9.

Lever 20 remains in the same position and has to be slightly displaced along key 19. The liquid supply shut-off operates as described above.

On a further displacement of pipe 9 towards the left into a position enabling engagement of pin 27 with the following groove 26 also one half of the orifices 8 communicate with passage holes 10, but the ratio of liquid supplies from hoses 16 and 17 respectively then alters to the relation 1:1.

A still further displacement of pipe 9 towards the left to pin 27 coinciding with the fourth groove 26 maintains the ratio of liquid supplies from both hoses 16 and 17 unchanged at the relation 1:1 but brings all orifices 8 into communication with corresponding passage holes 10.

By axial displacement of pipe 9 adjustments of the liquid supply rates and ratios may therefore be realized.

In the embodiments represened in FIGS. 6 and 7 the shut-off element of a discharge opening 35 consists of a valve needle 36 directly connected with piston 22. In the position represented in the drawing discharge opening 35 is shut off by valve needle 36 under the action of a not shown piston control device.

This latter embodiment can be used in more simple applications than the one described previously.

What we claim is:

1. In combination with a mixing chamber, wall means defining an inlet communicating directly with the interior of said mixing chamber for receiving and delivering relatively solid ingredients to be mixed with liquid media; said mixing chamber having an outlet for the mixed ingredients, spaced from said inlet; a first conduit extending across said inlet with its exterior surface in substantially spaced relation to said wall means, and formed with apertures spaced along its length within said inlet and communicating directly with the interior of said inlet; a second conduit telescoped within said first conduit and formed with apertures spaced along its length within said first conduit; the spacings of said second apertures being equal to the spacings of said first apertures; said first and second conduits being relatively displaceable in an axial direction and in an angular direction; said first and second apertures being serially aligned in one of said directions through a distance such that, upon relative displacement of said conduits in said one direction, the number of registering first and second apertures is correspondingly varied; means for supplying a liquid media to at least one end of said second conduit for discharge into said inlet through aligned first and second apertures; means for maintaining a selected relative displacement of said conduits in said one direction to select the rate of supply of said liquid media to said mixing chamber; and means for relatively displacing said conduits in the other of said directions to selectively establish and interrupt communication between the interior of said first conduit and said first apertures to selectively establish and interrupt the supply of liquid media to said inlet directly at said inlet.

2. In combination with a mixing chamber, wall means defining an inlet for receiving relatively solid ingredients to be mixed with liquid media and delivering said relatively solid ingredients directly to said mixing chamber; said chamber being formed with an outlet for the mixed ingredients, spaced from said inlet; a first conduit extending across said inlet with its exterior surface in substantially spaced relation to said wall means and formed with apertures spaced along its length within said inlet and communicating directly with the interior of said inlet; a second conduit telescoped in said first conduit and formed with apertures spaced along its length corresponding to the length of said first conduit within said inlet; the spacings of said second apertures being each substantially equal to the spacings of said first apertures; said first and second conduits being relatively displaceable in an axial direction and in an angular direction; said first and second apertures being serially aligned through substantially equal distances in said axial direction and through a distance such that, upon relatively axial displacement of said conduits in said axial direction, the number of registering first and second apertures is correspondingly varied; means for supplying liquid media to at least one end of said second conduit for discharge into said inlet through aligned first and second apertures; means for maintaining a selected relative axial displacement of said first and second conduits to select the rate of flow of said liquid media to said mixing chamber; and means for relatively displacing said first and second conduits angularly to selectively establish and interrupt communication between the interior of said second conduit and said first apertures to selectively establish and interrupt delivery of said liquid media to said inlet directly at said inlet.

3. In combination with a mixing chamber, wall means defining an inlet for receiving relatively solid ingredients to be mixed with liquid media and delivering said relatively solid ingredients directly to said mixing chamber; said chamber being formed with an outlet for the mixed ingredients, spaced from said inlet; a first conduit extending across said inlet with its exterior surface in substantially spaced relation to said wall means and formed with apertures spaced along its length within said inlet and communicating directly with the interior of said inlet; a second conduit telescoped in said first conduit and formed with apertures spaced along its length corresponding to the length of said first conduit within said inlet; the spacings of said second apertures being each substantially equal to the spacings of said first apertures; said first and second conduits being relatively displaceable in an axial direction and in an angular direction; said first and second apertures being serially aligned through substantially equal distances in said axial direction and through a distance such that, upon relatively axial displacement of said conduits in said axial direction, the number of registering first and second apertures is correspondingly varied; a partition extending across the interior of said second conduit intermediate its ends and substantially at the midpoint of the axially extending series of apertures therein, whereby to provide two compartments in said second conduit each communicating with a respective end thereof; means for supplying different fluid media to opposite ends of said second conduit for discharge into said inlet through aligned first and second apertures, means for selectively maintaining a relative axial displacement of said conduits to proportion the number of registering first and second apertures on opposite sides of said partition to proportion the two liquid media delivered to said inlet; and means for selectively effecting relative angular displacement of said conduits to selectively establish and interrupt communication between the interior of said second conduit and said first apertures to selectively establish and interrupt delivery of said fluid media to said inlet directly at said inlet.

4. The combination, claimed in claim 1, in which the apertures of each series are arranged in pairs, the distance between the apertures of each pair being equal to one half the distance between adjacent apertures of adjacent pairs of apertures.

5. The combination, claimed in claim 2, in which there are plural series of apertures in each of said conduits, the series of apertures in each conduit being equal to the number of series of apertures in the other conduit; the series of apertures being spaced at uniform and corresponding angular spacings, in each conduit, through an arc of the order of 180°.

References Cited by the Examiner

UNITED STATES PATENTS

| | | | |
|---|---|---|---|
| 748,744 | 1/04 | Jones | 137—604 XR |
| 1,169,090 | 1/16 | Lucke | 137—625.17 |
| 1,572,509 | 2/26 | Schaneider | 137—604 XR |
| 2,412,037 | 12/46 | Ferrell | 137—625.41 XR |

FOREIGN PATENTS 674,094    6/52    Great Britain.

WILLIAM F. O'DEA, *Primary Examiner.*